United States Patent [19]

Scharbach

[11] Patent Number: 4,946,304
[45] Date of Patent: Aug. 7, 1990

[54] WELD JOINT

[75] Inventor: Heinz Scharbach, Plankstadt, Fed. Rep. of Germany

[73] Assignee: The Pfaudler Companies, Inc., Rochester, N.Y.

[21] Appl. No.: 193,909

[22] Filed: May 13, 1988

Related U.S. Application Data

[63] Continuation of Ser. No. 785,695, Oct. 9, 1985, abandoned.

[30] Foreign Application Priority Data

Oct. 13, 1984 [DE] Fed. Rep. of Germany ....... 3437618

[51] Int. Cl.⁵ ............................................. B23K 15/00
[52] U.S. Cl. .................................. 403/272; 228/175; 219/121.13
[58] Field of Search .................. 403/271, 270, 272; 228/175, 214; 219/121.13

[56] References Cited

U.S. PATENT DOCUMENTS

| | | | |
|---|---|---|---|
| 3,558,067 | 1/1971 | Jenness | 228/175 X |
| 4,030,848 | 6/1977 | Keifert et al. | 403/272 |
| 4,073,427 | 2/1978 | Keifert et al. | 403/272 X |
| 4,187,407 | 2/1980 | Marko, Jr. | 403/271 X |
| 4,193,529 | 3/1980 | Dick et al. | 228/175 X |
| 4,430,550 | 2/1984 | de Sivry et al. | 219/121 ED |
| 4,459,062 | 7/1984 | Siebert | 403/271 |

FOREIGN PATENT DOCUMENTS

| | | |
|---|---|---|
| 11055 | 2/1970 | Australia . |
| 2034076 | 1/1972 | Fed. Rep. of Germany . |
| 2559129 | 12/1975 | Fed. Rep. of Germany . |
| 60-115381 | 6/1985 | Japan ............................ 219/121 ED |

OTHER PUBLICATIONS

SchweiBen und Schneiden, 1/1971, Heft 7.
Houdremont I, 3rd Edition, pp. 549–555 and 606–610, 9/1984.

*Primary Examiner*—Peter M. Cuomo
*Attorney, Agent, or Firm*—Ellen K. Park; Michael L. Dunn

[57] ABSTRACT

A weld joint between two structural elements out of different metallic carrier materials is described, in which at least approximately unmixed weld-joint-interface between the two elements made in such a manner, that on the one side of the interface only metal out of the one carrier material and on the other side only metal of the other carrier material is present. For example, the weld-joint-interface is made by an electron-beam welding. The surface of the weld joint can be enamelled and the welding of the two elements can be performed by a normal melt-welding method, in which welding material out of the metal of the respective carrier materials is laid on.

1 Claim, 1 Drawing Sheet

WELD JOINT

This is a continuation of application Ser. No. 785,695, filed Oct. 9, 1985, now abandoned.

BACKGROUND OF THE INVENTION

1. Field of the Invention

The present invention relates generally to the field of joining dissimilar metals by welding and more specifically to the field of joining dissimilar metals by welding to produce a weld joint which can be glass or enamel coated wherein such coatings will not be subject to the formation of defects caused by the differing rates of temperature differentials which induce expansion and contraction between the dissimilar metals which are joined by such a weld joint.

2. Background

In the chemical processing industry, chemical reaction vessels are used. Such vessels may be formed of mild, or low-to-medium carbon steels of various grades. For example tanks, generally in the form of cylindrical sections, with heads enclosing the ends; are a common arrangement for chemical reaction vessels. The heads are generally welded to a hollow cylindrical section which is formed from rolling steel plates. Ports are then generally formed by welding various conduit attachment devices, such as for example flanges, to apertures formed through the walls of such a chemical reaction vessel. Such apertures can be formed through the heads or through the hollow cylindrical sections, as desired. The purpose of such ports is for providing means of ingress and egress of the materials to be processed within the reaction vessel, for the purpose of insertion of processing equipment into the reaction vessel, for the purpose of inserting measuring apparatus into the reaction vessel and for the purpose of providing openings through which the interior of the reaction vessel can be inspected, maintained and cleaned.

Such chemical reaction vessels, in certain circumstances, are provided with a glass or enamel coating on the interior thereof, normally through known processes and techniques which fuse the glass or enamel to those metal surfaces which form the interior walls of such vessels, as well as to the interiors of the adjacent conduit attachment devices. The purpose of such glass or enamel coatings is to prevent or inhibit the adverse effects produced from the chemical reactions and processing, as carried out within such vessels, from directly attacking the metal used to form those vessels. Such adverse affects can be, for example, corrosion, erosion and/or abrasion.

In many situations, chemical reaction vessels are required to operate under condition of elevated pressure within. For a chemical reaction vessel to properly contain such elevated pressures, in situations where the adverse effects produced from the chemical reactions are present, critical design criteria are required. Firstly, the steel, which forms the hollow cylindrical section of the body of the chemical reaction vessel, must be of special quality with carefully controlled ranges of carbon and alloying elements and free of flaws such as porosity, laminations and cracks. Tight controls must also be applied in annealing and stress relieving such steel. Also, when such steel is welded to itself, special techniques and controls must be implemented to insure high integrity weld joints.

Secondly, due to the special requirements and techniques used to form the heads in dished shapes, different compositions of steels, containing different carbon levels and types and/or quantities of alloying elements, from those used in the steels of the vessel body, may be required. In some circumstances, the heads may be required to be formed of low to medium alloy steels, as distinguished from mild steels.

Thirdly, the conduit attachment devices may be required to be formed of yet other compositions of steels or other metals, including differing levels of carbon content and different qualities and/or compositions of alloying elements.

In fabrication of such reaction vessels, the heads are usually welded to the ends of the hollow cylindrical body section of the reaction vessel, forming a closed tank. The conduit attachment devices are, likewise, welded to the heads and/or the body section. In many cases, such welds join what can be considered dissimilar metals to each other.

Once the reaction vessel has been welded together and all of the interior weld surfaces ground smooth, a glass or enamel coating is applied to all areas which will be exposed to the chemical reactions and processing which the chemical reaction vessel is designed to contain. Of course, such glass or enamel coatings must also cover the weld joints.

The glass or enamel coatings, fused onto the metals, are formulated to be capable of relatively uniform expansion and contraction when exposed to temperature differentiations. Those glass or enamel coatings are also formulated to generally match the coefficient of expansion and contraction of the metals to which they are fused. The problems occur at the weld joints. Although the coatings are capable of withstanding uniform stresses which are imposed in generally linear directions, localized irregular and/or erratic stressing frequently causes the coating to crack. Such stresses are caused by the welding of the dissimilar metals together, due to the irregular and relatively erratic interrelationships of the enlarged dendretic structures which form adjacent to the weld joints, as dissimilar metals are intermixed by the welding operations. The stresses are also caused by the differing coefficients of expansion and contraction of the dissimilar metals, and become more exaggerated as the weld joints become wider and deeper, as will be found in joining thicker metal sections. Because of the irregular dendretic structures and erratic localized grain boundries, the weld joint expansions and contractions are not generally linear, but rather, form complex stress patterns such differ from point to point throughout the weld joint in an erratic, irregular non-repetitive pattern. Such stress patterns cause or enhance the propensity of the glass or enamel coatings to crack and flake off, thus exposing the underlying metal surfaces to the adverse affects of the chemical reactions occurring within the vessel.

There is a need for a design of a weld joint between dissimilar metals, as characterized above, which does not form the irregular and exaggerated dendretic structure along the grain boundries of the weld zone, thus eliminating or significantly decreasing the occurrence of complex localized irregular stress patterns and tending more toward consistent linear stress patterns on the occurrence of temperature differential induced expansion and contraction. Such is provided by the present invention.

SUMMARY OF THE INVENTION

A weld joint is formed between two dissimilar metal body elements by butting those two elements together at a joint which is formed by creating a matching and mating flat smooth planar face, perpendicular to the general planar extension of each of the elements, on each of the ends of the two elements, respectively. The two abutted and mated matching flat smooth planar faces are welded together by means which substantially eliminates any intermingling of the two dissimilar metals. No filter metal is used to make this weld joint. Examples of preferred welding methods that can be used to accomplish a weld joint, designed as mentioned above, which precludes the intermingling of the two dissimilar metals, are electron beam, laser and explosion welding techniques, as are known, but which are performed in a vacuum. Other welding methods adaptable to the present invention include hot wire plasma, frictional or pressure welding techniques.

DETAILED DESCRIPTION

As explained above, the weld joint and method of the present invention can be used to join for example, heads to reactor bodies and conduit attachments to either heads or reactor bodies, both elements of dissimilar metal which would then be coated with glass or enamel. It is also possible to use the weld joint and the method of the present invention to join dissimilar metal elements together wherein one of the metal elements, itself, is of a highly corrosion-resistant alloy, thus eliminating the need to coat that element with glass or enamel. However, where such dissimilar metal elements are joined, it is highly desirable to coat both the non-corrosion resistant element and the weld joint with glass or enamel, as well as extending the glass coating beyond the weld joint onto the adjoining surface of the corrosion resistant metal element, especially where the chemical reactor is to be operated under elevated, temperatures, pressures and/or extreme corrosive conditions. This embodiment forms the basis of the detailed disclosure of the invention as follows.

Preferably, where a corrosion-resistant metal element is welded to a non-corrosion resistant metal element, in a chemical reaction, Ni and/or Co based alloys are used as the corrosion resistant metal because of the general comparable coefficients of expansion and contraction, vis-a-vis common carbon mild steel, and also because of the high chemical resistively exhibited by such corrosion resistant metals.

Figure 1:
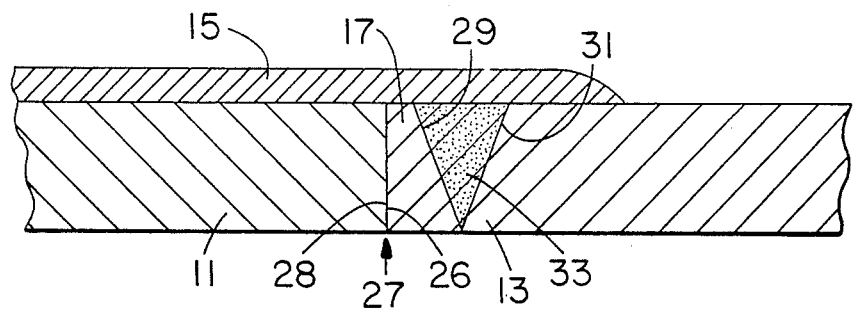
FIG. 1 is a cut away sectional schematic view of a weld joint where a single insert is used.
Figure 2:
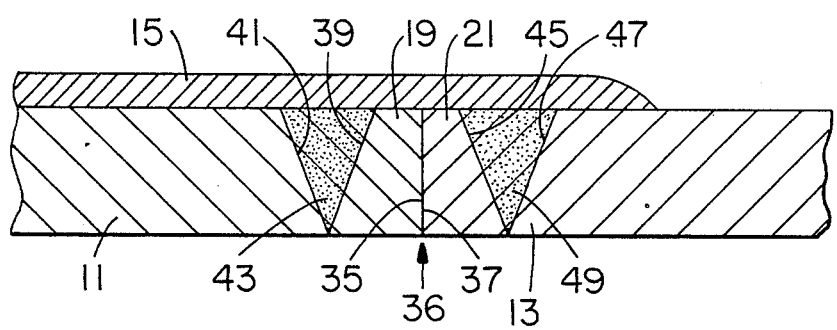
FIG. 2 is a cut away section schematic view of a weld joint where two inserts are used.
Figure 3:
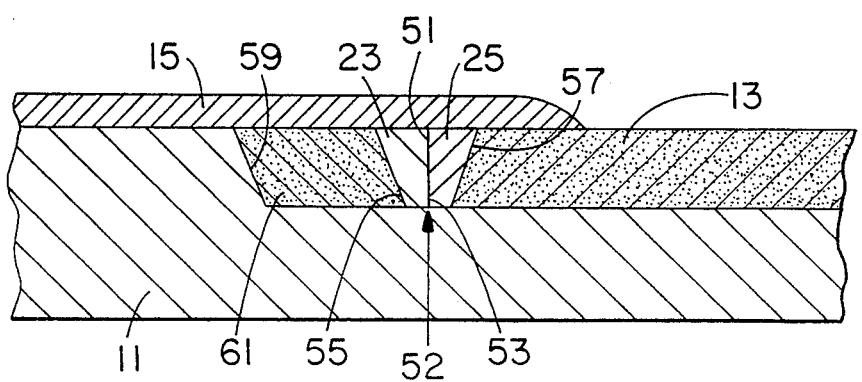
FIG. 3 is a cut away sectional schematic view of a weld joint where a dissimilar weld metal is overlayed onto a base metal and in which two inserts are used.

Referring to FIGS. 1-3, base metal element 11 is normally mild carbon steel, representing, for example, a hollow cylindrical reactor body, although it could also be any other element of the chemical reactor system which is glass or enamel coated. Secondary metal element 13 is a metal which is dissimilar to base metal element 11. Secondary metal element 13 may be dissimilar metal which, like base metal element 11 needs to be glass or enamel coated over all of its surface which is exposed to the chemical reaction. Alternatively, secondary metal element 13 may be a dissimilar metal which is highly chemically resistant and thus does not need to be entirely glass or enamel coated, as is shown in FIGS. 1-3. Examples of such materials are Inconel TM and Hastelloy TM, being nickel and cobolt based alloys, respectively. A glass or enamel coating, preferably a glass coating 15, is applied and fused to, inter alia, base metal element 11, in a conventional manner well known to those with skill in the art.

In most situations the overall assembly of the chemical reactor is difficult to subject to a vacuum, in a vacuum chamber, for welding by the preferred electron beam, laser or explosion welding techniques. Therefore, it is convenient to adapt a design which permits only parts of the assemblies to be subjected to those preferred welding techniques. The problem in subjecting the whole assembly to a vacuum chamber is one of the large size of the assembly relative to the smaller size of the vacuum chamber. Therefore weld inserts 17, 19, 21, 23 and 25 are utilized in alternative ways as shown in FIGS. 1-3.

Referring to FIG. 1, weld insert 17 is formed from the same metal as secondary metal element 13. A flat plane smooth surface 26 is generated on one edge of weld insert 17 to mate with a corresponding flat plane smooth surface 28 on base metal element 11 to form weld joint 27. The edge of weld insert 17, opposite from flat plane smooth surface 26, is formed into bevel 29 which forms, in combination with bevel 31, a v-shaped weld groove 33, the use of which will be explained hereinafter. The thickness of weld insert 17 is not particularly critical but preferably should be, as is shown in FIG. 1, generally equal to the corresponding thicknesses of base metal element 11 and secondary metal element 13.

Flat plane smooth surface 26 of weld insert 17 is mated with flat plane smooth surface 28 of base metal element 11 and held in place by conventional means while being inserted into a vacuum chamber where one of the preferred welding methods, most preferably electron beam welding, is applied to form weld joint 27. After weld joint 27 is formed, the assembly of secondary metal element 13 and weld insert 17 is aligned with base metal element 11 such that weld groove 33 is formed by bevels 29 and 31 about as shown in FIG. 1. Weld groove 33 is then filled with welding filler metal, using conventional welding techniques, to weld bevel 29 to bevel 31 thus joining base metal element 11 to secondary metal element 13 by way of a solid weld joint. Because of the use of one of the preferred welding techniques to form weld joint 27, there is no substantial intermingling of the dissimilar metals of base metal element 11 and weld insert 17, respectively, at weld joint 27. And, because weld insert 17 and secondary metal element 13 are of the same metal, two dissimilar metals are not joined at weld groove 33.

Referring to FIG. 2, there is shown an alternative embodiment of the weld joint of the present invention. Base metal element 11 and secondary metal element 13 are dissimilar metals to each other. Weld insert 19 is of metal which is identical to that of base metal element 11, and weld insert 21 is of metal which is identical to that of secondary metal element 13. Thus weld insert 19 and weld insert 21 are dissimilar metals to each other.

Weld insert 19, similar to weld insert 17, includes flat plane smooth surface 35 which is mated with flat plane smooth surface 37 of weld insert 21 to form weld joint 36. Flat plane smooth surface 35 and flat plane smooth surface 37 are mated together, and weld insert 19 and weld insert 21 are held together by conventional means while being inserted into a vacuum chamber where one of the preferred welding methods, most preferably electron beam welding, is applied to form weld joint 36. Similar to weld joint 27, in weld joint 36 there is no substantial intermingling of the dissimilar metals of weld insert 19 and weld insert 21, respectively, and the dissimilar metals of weld inserts 19 and 21 are joined together at weld joint 36.

The edge of weld insert 19, opposite from flat plane smooth surface 35, is formed into bevel 39 which forms, in combination with bevel 41, a v-shaped weld groove 43. Likewise, the edge of weld insert 21, opposite from flat plane smooth surface 37, is formed into bevel 45 which forms, in combination with bevel 47, another v-shaped, weld groove 49.

After weld joint 36 has been formed between flat plane smooth surface 35 and 37, weld grooves 43 and 49 are filled with welding filler metal, using conventional welding techniques, to weld bevel 39 to bevel 41 and bevel 45 to bevel 47, respectively.

The alternate embodiment shown in FIG. 2 is particularly useful where the sizes of both base metal element 11 and secondary metal element 13 are to large to lend themselves to the preferred welding techniques used in the present invention to join dissimilar metals.

Yet another alternate embodiment is shown in FIG. 3. In this embodiment, the secondary metal element 13 is weld metal which is overlayed onto a portion of base metal element 11. The purpose of such a joint would, most commonly, but not always, be to overlay a highly chemically resistant weld metal over an area of mild steel, due to the inability of an enamel or glass surface to adequately protect base metal element 11 in the area of the overlay.

In the alternate embodiment shown in FIG. 3, weld insert 23 is formed from the same metal as base metal element 11 while weld insert 25 is formed from the same metal as secondary metal element 13. Weld insert 23 includes flat plane smooth surface 51, and weld insert 25 includes flat plane smooth surface 53, both similar to weld inserts 19 and 21. Flat plane smooth surfaces 51 and 53 are mated together to form weld joint 52. Weld joint 52 is formed by holding weld inserts 23 and 25 together by conventional means, along mated flat plane smooth surfaces 51 and 53, while being inserted into a vacuum chamber where one of the preferred welding methods, most preferably electron beam welding, is applied.

The edge of weld insert 23, opposite from flat plane smooth surface 51, is formed into reverse bevel 55 while the edge of weld insert 25, opposite from flat plane smooth surface 53, is formed into reverse bevel 57. Reverse bevels 55 and 57 do not form v-shaped weld grooves with other bevels, thus differ in this respect from the alternate embodiments shown in FIGS. 1 and 2.

Base metal element 11, in the alternate embodiment shown in FIG. 3, is stepped or recessed to form two distinctly different thicknesses of metal as is shown in FIG. 3. The transition point between the two metal thicknesses is formed by bevel 59. The assembly of weld inserts 23 and 25, which has already been previously joined by welding at weld joint 52 as explained above, is placed on top of the lesser thickness of base metal 11 but spaced apart from bevel 59 a sufficient distance to permit conventional welding techniques to completely fill the gap 61 therebetween with solid weld metal. In this embodiment, the vertical thickness of the assembly of weld inserts 23 and 25, as shown in FIG. 3, is generally equal to the difference in thicknesses of the metal of base metal element 11. Gap 61 is then filled with welding filler metal by conventional welding techniques such that weld insert 23 is joined by welding to base metal element 11. During this process, the assembly of weld inserts 23 and 25 is held in place, in respect to base metal element 11, by conventional means. Preferably, the welding process used to fill gap 61 has penetrated the bottom edge of weld insert 23, as shown in FIG. 3, to the point where that bottom edge is also fully welded to the portion of base metal element 11 which is directly beneath.

Finally, in the alternate embodiment shown in FIG. 3, secondary metal element 13, being welding filler metal is overlayed by conventional welding techniques to fully weld weld insert 25, including preferably its bottom edge, to base metal element 11 and to continue the overlay to the extent desired.

What is common to all of the above described alternate embodiments is that the point at which two dissimilar metals are joined together by welding, adjacent to the coating 15, which may be fused enamel or fused glass, are joined by a welding technique which excludes or prevents substantial intermingling of the dissimilar metals. Once the weld joints are formed, they are ground smooth and overlayed with a fused enamel or a fused glass coating 15 in a conventional manner as is known to those with skill in the art.

What is claimed is:

1. A glass coated article comprising a glass coated substrate, said substrate comprising at least two dissimilar metals and means for joining together said two dissimilar metals which substantially eliminates intermingling of said dissimilar metals, said dissimilar metals being joined by a weld joint adapted to prevent the cracking of the glass coating over a surface of said weld joint, said weld joint comprising:

(a) a base metal element, of a given composition of metal, including a first flat plane smooth surface on one edge thereof, said first flat plane smooth surface extending across that full surface of said base metal element which is to be joined to a dissimilar metal;

(b) a welding insert which is of a metal composition which is dissimilar to said base metal element, said welding insert including a second flat plane smooth surface on one edge thereof which is equivalent to said first flat plane smooth surface of said base metal element, said first flat plane smooth surface and said second flat plane smooth surface being welded together without substantial intermingling of said dissimilar metals of said welding insert and said base metal element, said welding insert including on its edge opposite from said second flat plane smooth surface, a first bevel adapted to form a first element of a v-shaped weld groove; and (c) a secondary metal element which is of a metal composition which is substantially identical to that of said welding insert, including a second bevel on one edge of said secondary metal element adapted to form a second element of said v-shaped weld groove, mated to said first element of said v-shaped weld groove, said v-shaped weld groove which is filled with welding filler metal to weld said first bevel to said second bevel.

* * * * *